United States Patent

[11] 3,563,121

| [72] | Inventors | Furman S. Cox<br>Seneca;<br>Warren P. Burgess, Salem, S.C. |
|---|---|---|
| [21] | Appl. No. | 782,274 |
| [22] | Filed | Dec. 9, 1968 |
| [45] | Patented | Feb. 16, 1971 |
| [73] | Assignee | Deering Milliken Research Corporation<br>Spartanburg, S.C.<br>a corporation of South Carolina |

[54] CUTTING APPARATUS
3 Claims, 5 Drawing Figs.

[52] U.S. Cl. .................................................... 83/105,
83/444, 83/449
[51] Int. Cl. .................................................... B23d 45/12
[50] Field of Search .......................................... 83/105,
107, 103, 104, 431, 437, 448, 449, 450, 444, 924,
54; 143/40, 157—4; 81/9.5

[56] References Cited
UNITED STATES PATENTS

| 1,366,082 | 1/1921 | Knabe .......................... | 83/437X |
| 2,880,636 | 4/1959 | Freedman et al. ............ | 83/924X |
| 3,173,320 | 3/1965 | Dabernard et al. ........... | 83/54X |
| 3,316,781 | 5/1967 | Bignell et al. ................. | 83/924X |

Primary Examiner—James M. Meister
Attorneys—Norman C. Armitage and H. William Petry

ABSTRACT: A cutting apparatus which employs two circular saws to cut a paper tube into two substantially identical semicircular halves. The saws are mounted on an adjustable frame having a plurality of members to guide the tube through the apparatus. Elongated plate members are provided on the frame in line with each of the saws to separate the halves after being cut.

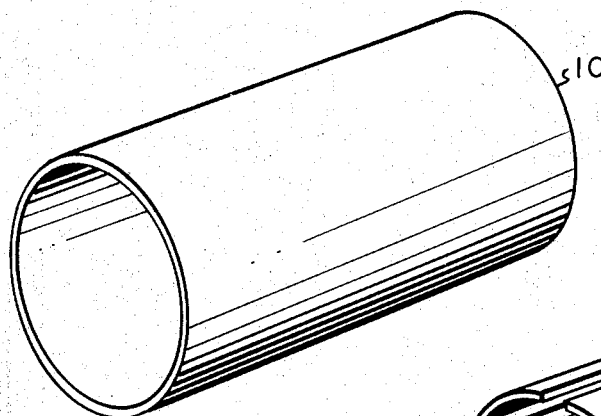
FIG.-1-
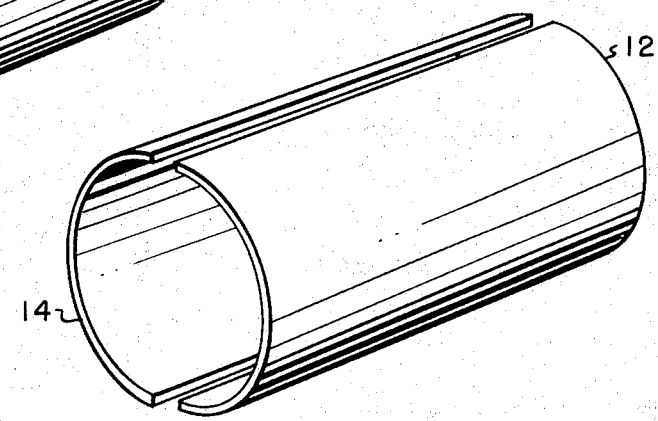
FIG.-2-
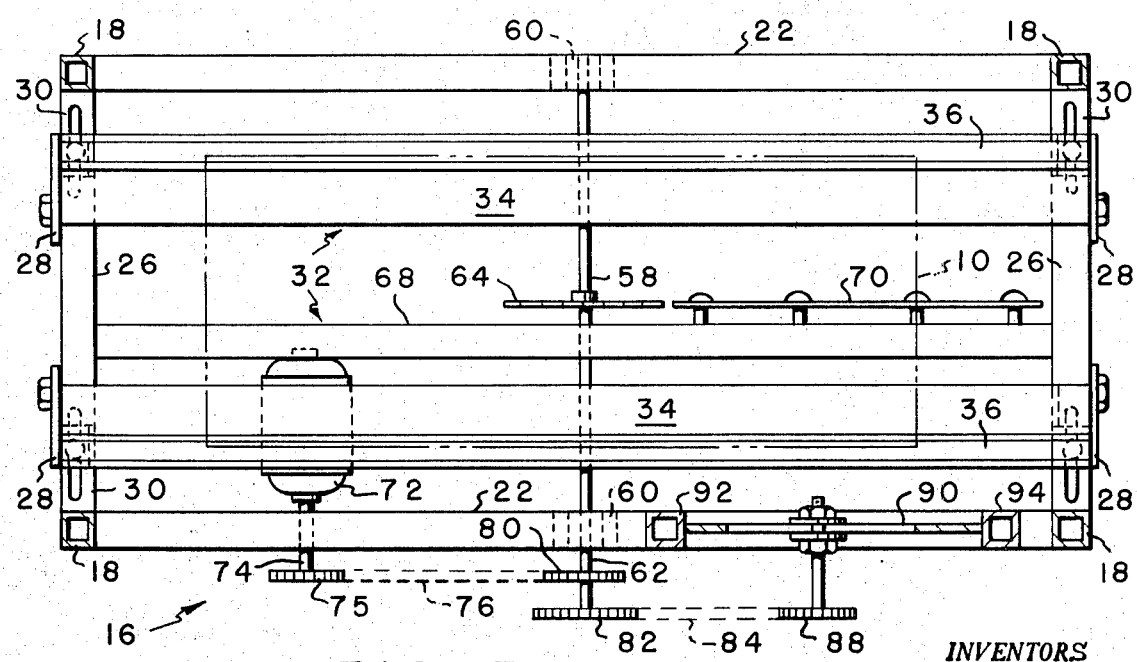
FIG.-3-
INVENTORS
FURMAN S. COX
WARREN P. BURGESS
BY
Earle R. Morden
ATTORNEY

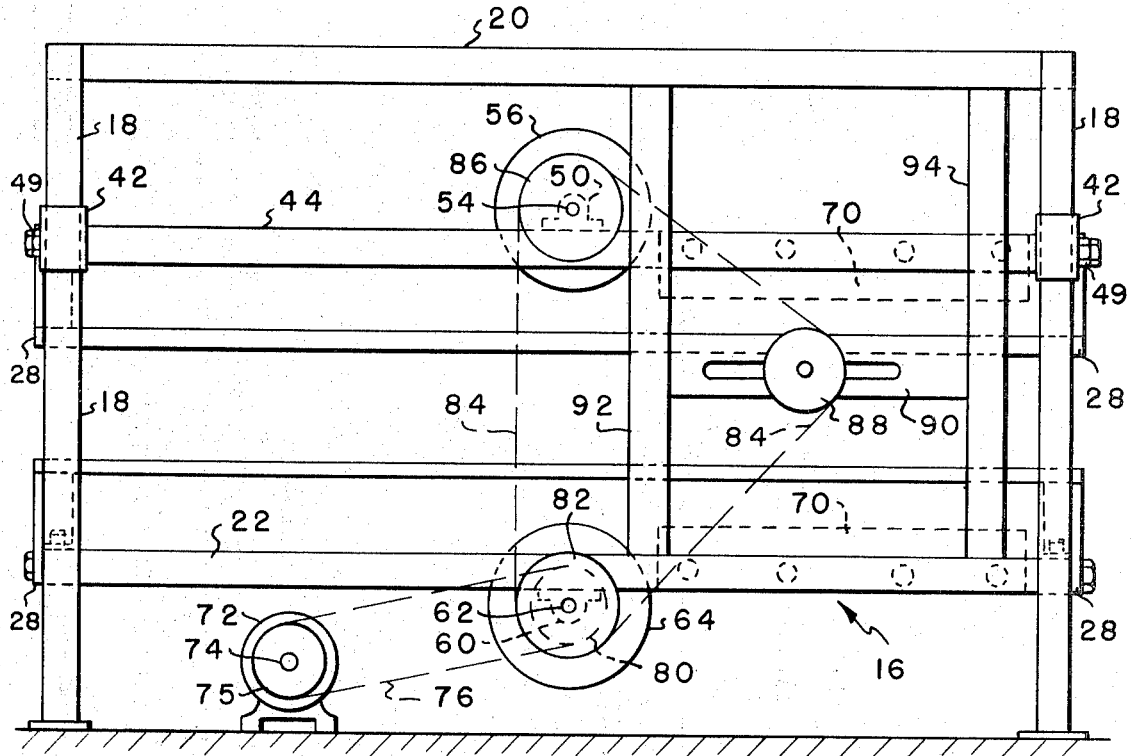
FIG.-4-
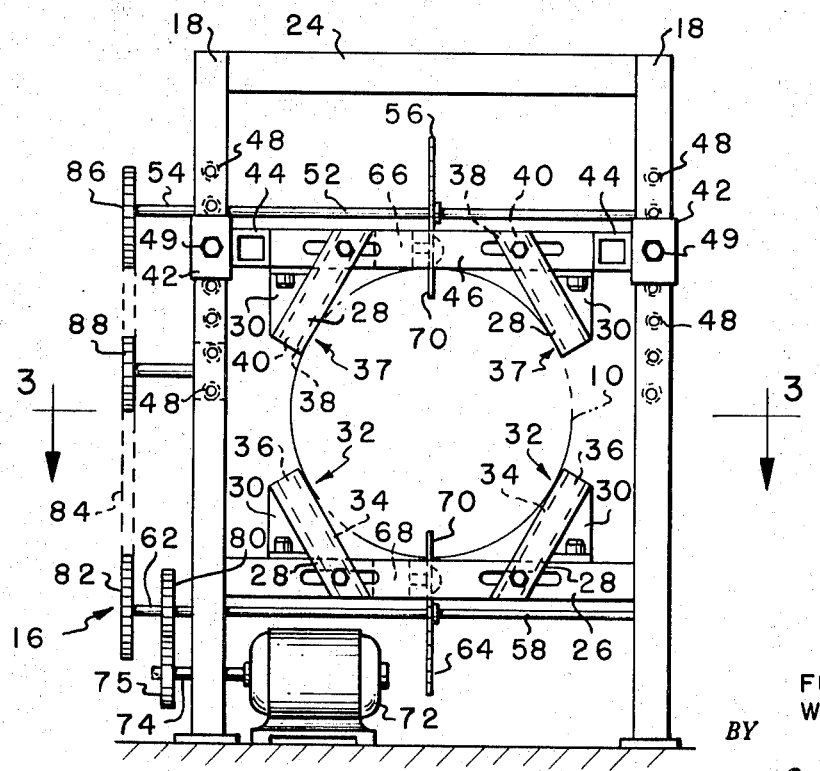
FIG.-5-
INVENTORS
FURMAN S. COX
WARREN P. BURGESS
BY
Earle R. Marden
ATTORNEY

CUTTING APPARATUS

In many industries it is desired to ship products which are circular in cross section and are rolled onto beams for shipment. Examples of such products would be rolls of paper, plastic film, textile fabrics, etc. One method evolved to efficiently wrap such products for shipment is to place headers on the ends of the beams on which the products are rolled and telescope two mating paperboard semicircular members over the headers and secure them thereto. Normally, these paperboard semicircular members are produced by splitting in half a cylindrical hollow paperboard tube.

Therefore, it is an object of this invention to provide an apparatus which will efficiently split hollow cylindrical tubes into substantially semicircular sections.

Other objects and advantages of the invention will become readily apparent as the specification proceeds to describe the invention, in which:

FIG. 1 is a perspective view of a cylindrical tube prior to cutting;

FIG. 2 is a perspective view of a cylindrical tube after it has been cut into semicircular halves;

FIG. 3 is a top sectional view of the new and improved tube-cutting apparatus taken on line 3—3 of FIG. 5;

FIG. 4 is a side elevation view of the new and improved tube-cutting apparatus taken on line 4—4 of FIG. 3; and FIG. 5 is an end view of the new and improved tube-cutting apparatus looking toward the exit end.

As discussed briefly above, the invention is directed to an apparatus to split or cut a cylindrical hollow member, such as the paperboard tube 10 shown in FIG. 1, into two substantially equal semicircular members, such as members 12 and 14 shown in FIG. 2. FIGS. 3—5 show in detail the preferred apparatus to sever the tube 10 shown in FIG. 1 into semicircular pieces 12 and 14 as shown in FIG. 2.

The new and improved cutting apparatus, generally designated 16, is supported basically by four rectangular end posts 18 connected together by upper and lower side beams 20 and 22 and upper and lower end beams 24 and 26 welded or otherwise secured to the posts 18. Slidably secured to the ends of the lower side beams 26 are plate members 28 which cooperate with plate members 30 slidably secured to the top of the lower side beams to support tube guide plates 32 which extend the full length of the machine 16. Tube guide plates consist of a front wooden plate 34 backed up by a metal plate 36.

Mounted above the lower tube guide plates 32 are upper guide plates 36 identical in construction with the lower tube guide plates 32 in that basically they consist of a front wooden plate 38 which contacts the tube 10 and a backup metal plate 40 for support. The upper guide plates are mounted on an upper adjustable frame which has collar members 42 which telescope the posts 18 and are interconnected by side beams 44 and end beams 46 in any suitable manner such as by welding. There is a plurality of openings 48 in the beams 18 so that the adjustable frame can be positioned in a number of positions and a bolt 49 inserted through the collar member 42 and into one of the openings 48 to retain the adjustable frame in the selected position. The adjustable frame also has adjustably connected thereto plate members 28 which cooperate with plate members 30 slidably secured to the bottom of the end beams 46 to support the upper guide plates 37 which guide the tubes 10 in operation.

Rotatably secured in bearings 50, attached to the top of side beams 44, is a shaft 52 which has one end 54 projecting outwardly from the machine 16 and supports a rotary saw blade 56 attached thereto. In like manner a shaft 58 is rotatably secured in bearings 60 attached to lower side beams 22 and has a projection 62 extending outwardly from the machine 16 and supports a rotary saw blade 64 fixed thereto. The saw blades 56 and 64 are located one over the other and have their faces lying in the same plane. Secured to the side of beam 66 secured between end beams 46 and to the side of beam 68 secured to lower end beams 26 are separator plates 70 which are in line with the saw blades 56 and 64 on the exit side thereof for reasons hereinafter explained.

To drive the saw blades 56 and 64 a motor 72 is mounted in any suitable manner to the machine. The motor 72 has an extended shaft 74 to which is attached a pulley 75 which is engaged by an endless drive belt 76 which engages a pulley 80 on the shaft projection 62 of shaft 58. Connected to shaft projection 62 is a second pulley 82 which drives an endless belt 84 which engages another pulley 86 on the shaft end 54 of shaft 52 and idler pulley 88 adjustably mounted in beam member 90 suitably secured to beams 92 and 94 welded or otherwise secured between beams 20 and 22.

OPERATION

When it is desired to split a tube 10 into semicircular sections 12 the machine is first adjusted to accommodate the desired tube size by adjusting the position of the tube guide plates 32 and 37, the height of the adjustable frame and the position of the idler pulley 88 to put proper tension on the drive belt 84. Then the motor 72 is started and the saw blades 56 and 64 set into rotary motion. Then the tube 10 is inserted into the space between the tube guide members 32 and 37 into the left end (FIGS. 3 and 4) and motivated toward the pair of saw blades. As the blades cut the tube 10 into halves 12 the halves 12 are separated by the separator plate 70 and remain separated as they are pushed out of the other end of the machine when they are removed by an operator or dropped onto a conveyor system and carried away for use or storage.

We have described a basic machine to cut cylindrical objects into semicircular segments, and it is obvious that adjuncts such as rollers on the guide members 32 and 37, a conveying system to convey tubes to the machine and cut segments away from the machine, etc., can be added without altering the basic concept of the machine. Also, if desired, a vacuum or dust pickup system may be employed to remove the dust generated by the action of the saw blades cutting the tubes. The basic machine efficiently separates a hollow cylindrical member into semicircular segments with a minimum effort and a minimum expenditure of time.

Although we have described specifically the preferred embodiment of our invention, we contemplate that changes may be made without departing from the scope or spirit of our invention, and we desire to be limited only by the scope of the claims.

We claim:

1. Apparatus to sever hollow tubular members into at least two segments comprising: an elongated frame having least a portion thereof adjustable, means operably associated with said frame to guide a hollow tubular member, at least two rotatably mounted cutting members mounted in said frame with one of said cutting members being mounted on said movable portion and being movable relative to said other cutting member and elongated plate members mounted in said frame in line with each of said cutting members to separate the hollow tubular segments after being cut, one of said elongated plate members being mounted on said adjustable frame portion.

2. The structure of claim 1 wherein said adjustable frame portion is mounted above the rest of said frame.

3. The structure of claim 1 wherein one of said elongated plate members is mounted on said adjustable frame portion.